US006256986B1

(12) United States Patent
Langen et al.

(10) Patent No.: US 6,256,986 B1
(45) Date of Patent: Jul. 10, 2001

(54) HYDROSTATIC DRIVE SYSTEM

(75) Inventors: Alfred Langen, Goldbach; Horst Deininger, Horstein-Alzenau, both of (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/358,946

(22) Filed: Jul. 22, 1999

(30) Foreign Application Priority Data

Aug. 3, 1998 (DE) ........................................ 198 35 015

(51) Int. Cl.[7] ........................................ F16D 31/02

(52) U.S. Cl. ........................ 60/462; 60/466; 73/861.71

(58) Field of Search ........................ 60/422, 427, 462, 60/463, 465, 466, 470; 73/861.71

(56) References Cited

U.S. PATENT DOCUMENTS

| | | | | |
|---|---|---|---|---|
| 3,722,278 | * | 3/1973 | Young et al. | 73/861.71 |
| 4,776,164 | * | 10/1988 | Barbagli | 60/423 |
| 4,856,278 | * | 8/1989 | Widmann et al. | 60/423 |
| 4,884,402 | * | 12/1989 | Strenzke et al. | 60/426 |
| 5,033,311 | * | 7/1991 | Custer | 73/761.71 X |
| 5,065,577 | * | 11/1991 | Markunas | 60/466 X |
| 5,207,059 | * | 5/1993 | Schexnayder | 60/465 |
| 5,428,958 | * | 7/1995 | Stenlund | 60/427 X |
| 5,535,587 | * | 7/1996 | Tanaka et al. | 60/427 |

* cited by examiner

*Primary Examiner*—John E. Ryznic
(74) *Attorney, Agent, or Firm*—Webb Ziesenheim Logsdon Orkin & Hanson, P.C.

(57) ABSTRACT

A hydrostatic drive system with a pump and at least one consuming device that is connected to the pump can be actuated by a control valve. The control valve can be actuated as a function of an actuator that specifies a desired speed of movement and a direction of movement of the consuming device. The control valve in the center position, makes possible an unpressurized circulation of the pump. The control valve can be actuated electrically, and there is a sensor that measures the actual speed of movement of the consuming device. The control valve, the speed-of-movement sensor and the actuator are connected with an electronic control that controls the control valve as a function of the direction and speed of movement specified by the deflection of the actuator and of the actual speed of movement of the consuming device as measured by the speed-of-movement sensor. The speed-of-movement sensor may be a delivery flow sensor.

25 Claims, 4 Drawing Sheets

HYDROSTATIC DRIVE SYSTEM

BACKGROUND OF THE INVENTION

1. Field of the Invention

This invention relates to a hydrostatic drive system with a pump and at least one consuming device that is connected to the pump and can be actuated by a control valve. In particular, the control valve can be actuated as a function of an actuator that specifies a desired speed of movement and a direction of movement of the consumer, and the control valve, in the neutral position, makes possible an unpressurized circulation of the pump.

2. Background Information

Similar hydrostatic drive systems in which a pump, for example a pump with a constant delivery volume, is provided for the pressurization of a plurality of consuming devices, and when the consuming devices are not actuated, the pump is operated in an unpressurized circulation, are used in machines, for example in fork-lift trucks, to actuate the hydraulic work system.

The prior art discloses systems in which the control valves are directional control valves that throttle the flow in intermediate positions and have an open neutral position. Therefore, the control valves are also designated open-center control valves that can be actuated by a human operator as a function of the deflection of the actuator. When the directional control valve is deflected, the directional control valve throttles the unrestricted circulation of the pump and connects the delivery line of the pump with the hydraulic line that leads to the consuming device. A pressure is thereby built up in the delivery line, as a result of which the consuming device is set in motion. A desired speed of movement of the consuming device is specified by the opening width of the directional control valve as a function of the deflection of the actuator. The delivery current of the pump not required by the actuated consuming device flows via the unrestricted circulation of the directional control valves to the reservoir. When a plurality of consuming devices that have different load pressures are actuated simultaneously, however, operating conditions can occur in which an excessive hydraulic flow is delivered to the consuming device that has the lower load pressure. To prevent an increase in the speed of movement of the consuming device that has the lower load pressure, the corresponding directional control valve must be modulated into a switched position that throttles the admission to the consuming device. As a result, however, there is an increased amount of effort required on the part of the operator who is operating the drive system, because when the operator has to actuate a plurality of consuming devices simultaneously, he must readjust the speed of movement of the consuming devices by a corresponding deflection of the actuator.

The object of this invention is to make available a hydrostatic drive system of the type described above that easily and economically makes it possible to operate the consuming devices independently of the load.

SUMMARY OF THE INVENTION

The invention teaches that the control valve can be actuated electrically, and there is a device (i.e., sensor) that indicates the actual speed of the consuming device, whereby the control valve, the device that indicates the actual speed of movement and the actuator are effectively connected to an electronic control that controls the control valve as a function of the direction and speed of movement specified by the deflection of the actuator, as well as the speed of movement of the consuming device as measured by the sensor that measures the actual speed of movement.

When the actuator is actuated, a desired direction of movement and a desired speed of movement of the consuming device are specified, and the control valve that actuates the consuming device is actuated. It is possible to actuate the control valve by the speed-of-movement sensor such that the actual speed of movement equals the desired speed of movement specified by the actuator. If an additional consuming device with a higher load pressure is actuated, the speed-of-movement sensor detects an increase in the actual speed of the consuming device that is pressurized by the lower load pressure. The electronic control actuates the consuming device that has the lower load pressure by the control valve so that its actual speed of movement is retained. The consuming devices are therefore operated independently of the load at the desired speed of movement specified at the actuator.

In one embodiment of the invention, the speed-of-movement sensor is a delivery flow sensor. Using a delivery current sensor that measures the hydraulic flow, it becomes possible for the electronic control to easily measure the actual speed of movement of the consuming device. It is also possible to measure the actual speed of movement by speed sensors located on the consumer, e.g. displacement sensors or sensors that measure angular rotation.

In one embodiment of the invention in which the consuming device is a double-acting consuming device, the delivery flow sensor is located in a hydraulic line that leads from the consuming device to the reservoir. In this case, the delivery flow sensor is located in the discharge line of the consuming device, and thus measures the hydraulic flow from the consuming device to the reservoir. As a result of the measurement of the hydraulic flow being discharged by the consuming device, it is also possible, when there is a change in the direction of the load exerted on the consuming device, for example from a positive load to a negative load, to measure an increase in the actual speed of movement of the consuming device and to actuate the control valve such that the consuming device is operated at a constant actual speed of movement, even in the event of a change in the direction of the load. With a delivery flow sensor located in the discharge line of the consuming device, both in the event of the simultaneous actuation of a plurality of consumers with load pressures at different levels and in the event of the reversal of the direction of the load on the consuming device, an elevated discharge-side hydraulic flow and an increase in the actual speed of movement of the consuming device can be measured in a simple manner. The delivery flow sensor can thereby be located upstream or downstream of the control valve.

The delivery flow sensor may be located in a return line that leads from the control valve to the reservoir. With a double-acting consuming device, in which the control valve is connected to a delivery line of the pump, a return line and two hydraulic lines that lead to the consuming device, the flow of hydraulic fluid out of the consuming device can be measured by only one delivery flow sensor. The delivery flow sensor may be located in the return line downstream of the control valve, regardless of the direction of movement of the consuming device. This results in reduced effort, time and cost of construction.

It is appropriate, when the control valve is actuated toward the neutral position, if the admission cross section of a pump delivery line to a hydraulic line in communication with the consuming device can be reduced by the control valve before the discharge cross section of a hydraulic line in communication with the consuming device to the reservoir. If, when the control valve is deflected, the delivery flow sensor located in the return line detects an excessive actual speed of movement, this situation may be the result of the actuation of an additional consuming device at a higher load pressure, or by a reversal of the load direction on the consuming device. In the event of an excessive actual speed of movement, the electronic control actuates the control valve toward the neutral position. First the admission cross section formed by the control valve is reduced and thus throttled. Under operating conditions in which an additional consuming device is actuated at a higher load pressure, it becomes possible to counteract an increase in the speed of movement of the consuming device. If, when the admission cross section is throttled, the speed of movement of the consuming device detected by the delivery flow sensor remains greater than the desired speed of movement, a negative load is exerted on the consuming device. As a result of an additional deflection of the control valve toward the neutral position, the discharge cross section formed by the control valve is also reduced and thus throttled, so that an increase in the actual speed of movement resulting from a change in the direction of the load applied to the consuming device can be counteracted.

A feeder device may be provided on the consumer device, and is in communication on the admission side with the return line leading from the control valve to the reservoir downstream of the delivery flow sensor. Under operating conditions in which the admission cross section is throttled, or closed, and the consuming device is moved as a result of a negative load, it is thereby possible for hydraulic fluid to flow from the reservoir to the admission side of the consuming device, and thereby prevent cavitation on the inlet side of the consuming device.

In addition, when there is a double-acting consuming device, it is possible to locate a delivery flow sensor in each of the hydraulic lines leading from the control valve to the consuming device. The hydraulic lines can be connected by the control valve to the delivery line of the pump. The delivery flow sensor is thereby located in the admission line of the consuming device and measures the hydraulic flow into the consuming device. The control of the consuming device is thereby exercised as a function of the hydraulic current flowing to the consuming device, as a result of which the consuming device can be operated independently of the load.

It is also possible to locate one delivery flow sensor in the admission line and one delivery flow sensor in the return line, and thus, when the consuming device is actuated, to simultaneously measure the hydraulic flow into the consuming device and out of the consuming device. When delivery flow sensors are located, respectively, in the admission line and the discharge line of the consuming device, it is possible to measure in a simple manner whether there is an increase in the speed of the consuming device as a result of an increased hydraulic flow in the admission line in the event of the simultaneous actuation of a plurality of consuming devices or as a result of an increased hydraulic fluid in the return line of the consuming device in the event of a change in the direction of the load applied to the consuming device. The electronic control can recognize, by the use of one delivery flow sensor located in the admission and one delivery flow sensor located in the discharge of the consuming device, whether an increase in the current speed of movement was caused by the actuation of an additional consuming device at a higher load pressure or by the reversal of the load direction on the consuming device. An appropriate actuation of the control valve allows control of the actual speed of movement of the consuming device independently of the load and of the direction of the load.

In an additional embodiment of the invention, in which the consuming device is a single-action consuming device and is connected by the control valve to the pump, a delivery flow sensor is located in a hydraulic line leading from the control valve to the consuming device. When the consuming device is connected by the control valve to the reservoir, a delivery flow sensor is provided in a hydraulic line leading from the control valve to the reservoir.

With a single-action consuming device, therefore, in a first switched position of the control valve, the hydraulic flow flowing to the consuming device, and in a second switched position of the control valve, the hydraulic flow flowing out of the consuming device can each be measured by respective delivery flow sensors. It is thereby possible, on a single-action consuming device, to measure the current speed of movement of the consuming device in both directions of movement. The current speed of movement of the single-action consuming device can therefore be controlled independently of the load in both directions of movement of the consuming device.

In one refinement of the invention, a seat valve that opens toward the consuming device is located in the hydraulic line that leads from the control valve to the consuming device. It is thereby possible to isolate both a single-action consuming device or a double-action consuming device without any leakage of hydraulic fluid, so that the consuming device maintains its position when the control valve is in the neutral position.

The seat valve may have a control compression chamber that acts in the closing direction that can be pressurized at the load pressure of the consuming device or by a spring. The seat valve is thus pressurized toward the closed position by the load pressure of the consuming device and by the spring. If the hydraulic line forms the admission line, the seat valve can therefore be pressurized only into the opening position, and the consuming device can only be moved if the pump pressure that has built up exceeds the load pressure of the consuming device and the force of the spring. The seat valve for the leak-free isolation of the consuming device therefore also performs the function of a load-holding valve, and prevents an uncontrolled movement of the consuming device when the consuming device is actuated.

The seat valve can be appropriately actuated when the hydraulic line is connected with the reservoir by the control valve. It is thereby ensured that in an operating condition in which the hydraulic pressure line forms the discharge line of the consuming device, the seat valve is pressurized into the open position, and thus hydraulic fluid can flow from the consuming device to the reservoir.

In one refinement, the seat valve can be actuated by a pilot valve that is mechanically actuated by the control valve. When the control valve is deflected, the pilot valve is thereby actuated, and the seat valve that is located in the discharge line of the consuming device is actuated into the open position. The seat valve can thereby be actuated by the control valve, as a result of which the time, effort and expense of construction can be reduced.

The pilot valve may be located in a control pressure line that leads from the control compression chamber that acts in the closing direction of the seat valve to the reservoir. The pilot valve may be a spring-loaded check valve that checks in the direction of the reservoir, and has a valve body that can be actuated into the open position by the valve slide of the control valve. When the control valve is deflected, the pilot valve is moved into the open position. The control compression chamber of the seat valve that acts in the closing direction is thereby connected with the reservoir and is relieved, as a result of which the seat valve is actuated. It thereby becomes possible in a simple manner to actuate the seat valve in the outlet-side hydraulic line in the event of an actuation of the control valve.

In one configuration, the delivery flow sensor is a seat valve and has the function of the seat valve. The drive system is easier and more economical to manufacture and requires a small number of valve elements, because instead of a delivery flow sensor and a separate seat valve, only one element is necessary that performs the function of both the delivery flow sensor and of the seat valve.

The control valve may be actuated by a stepper motor. The use of a stepper motor makes it possible to easily and economically actuate the control valve electrically and to actuate the pilot valves.

For safety reasons, the stepper motor has a spring retraction device. In the event of a power failure, the spring retraction device thus moves the stepper motor and the control valve into the neutral position.

In one configuration, the delivery flow sensor has a valve body that is mounted so that it can move longitudinally in a housing boring, which valve body can be moved by a spring toward a closed position, and can also be moved in the direction of an open position by hydraulic fluid flowing in from the valve body against an active surface, in particular an end surface. The valve body of the delivery flow sensor is thereby moved and deflected by the hydraulic fluid flowing into the valve body against the active surface. The valve body of the delivery flow sensor thus has, for a determined hydraulic flow flowing into the delivery flow sensor in the housing boring on the active surface, an associated opening travel which can be measured in a simple manner.

In one embodiment, the deflection of the valve body of the delivery flow sensor can be measured by an inductive sensor. With an inductive sensor, it is easy to measure the deflection of the valve body of the delivery flow sensor, which is a measurement of the hydraulic flow flowing into or out of the delivery flow sensor and thus the consuming device, and to transmit that measurement to the electronic control. The delivery flow characteristic of the delivery flow sensor is thereby stored in the electronic control.

In an additional embodiment, the valve body of the delivery flow sensor is effectively connected to a Hall sensor. It is thereby also possible to measure the opening travel of the valve body. In such a case, the valve body of the delivery flow sensor may be provided with a permanently magnet body that is effectively connected with a Hall sensor located in a housing of the delivery flow sensor and connected with the electronic control.

The valve body of the delivery flow sensor may be provided with a micro-control device in the vicinity of the active surface. The micro-control device, for example a microcontrol groove or a micro-control segment can measure a small flow of hydraulic fluid flowing to the delivery flow sensor with corresponding accuracy.

The control valve may be an open-center multiple way valve that acts as a throttle in intermediate positions. The direction of movement and the current speed of movement of the consuming device can thus be controlled by a corresponding deflection of the directional control valve by the electronic control.

In one configuration, the delivery flow sensor is located coaxially with the valve slide of the directional control valve. The result is a particularly compact device that is simple to manufacture, because there is no need for a separate valve axis for the delivery flow sensor.

The pump may be a pump that has a constant delivery volume. Because the flow is unrestricted in the neutral position of the control valves, the hydraulic fluid delivered by a constant pump can flow to the reservoir in unpressurized circulation. When the control valves are actuated, the hydraulic fluid not required by the consuming devices flows to the reservoir via the unrestricted circulation.

In one refinement of the invention, the pump is a variable-delivery pump that has a variable delivery volume, whereby there is a delivery flow controller that is effectively connected with the electronic control. As a result of the unrestricted circulation of the control valve, it is possible to use a delivery flow controller that adjusts the delivery volume of the pump with a low degree of accuracy to the hydraulic flow required by the consuming devices. When the consuming device is actuated, the pump thereby delivers a hydraulic flow that is greater by a certain degree defined by the inaccuracy of the delivery flow controller than the hydraulic flow required by the consuming device. The excess hydraulic flow delivered by the pump is thereby delivered via the unrestricted circulation of the control valve to the reservoir, whereby the losses are represented by the product of the excess hydraulic flow that is delivered by the pump and is discharged via the unrestricted circulation of the control valve and the pressure of the consuming device. On hydrostatic drive systems with a constant-delivery pump, on the other hand, the losses are represented by the difference between the constant delivery flow of the pump and the hydraulic fluid required by the consuming device over the hydraulic fluid flowing out via the unrestricted circulation and the pressure of the consuming device. The use of a variable-delivery pump with a simple pump controller makes it possible to eliminate the energy losses easily and economically.

The drive system of the invention may be used in a machine, in particular in a fork lift truck. It thereby becomes possible, using simple components and a small number of valves, to achieve an operation of the consuming devices of the hydraulic work system, for example a lifting cylinder, tilting cylinders and additional hydraulic consuming devices, that is independent of the load and independent of the direction of the load.

BRIEF DESCRIPTION OF THE DRAWINGS

Additional advantages and details of the invention are explained in greater detail below with reference to the exemplary embodiments that are illustrated in the accompanying schematic figures, in which.

DETAILED DESCRIPTION OF THE PREFERRED EMBODIMENTS

Figure 1:
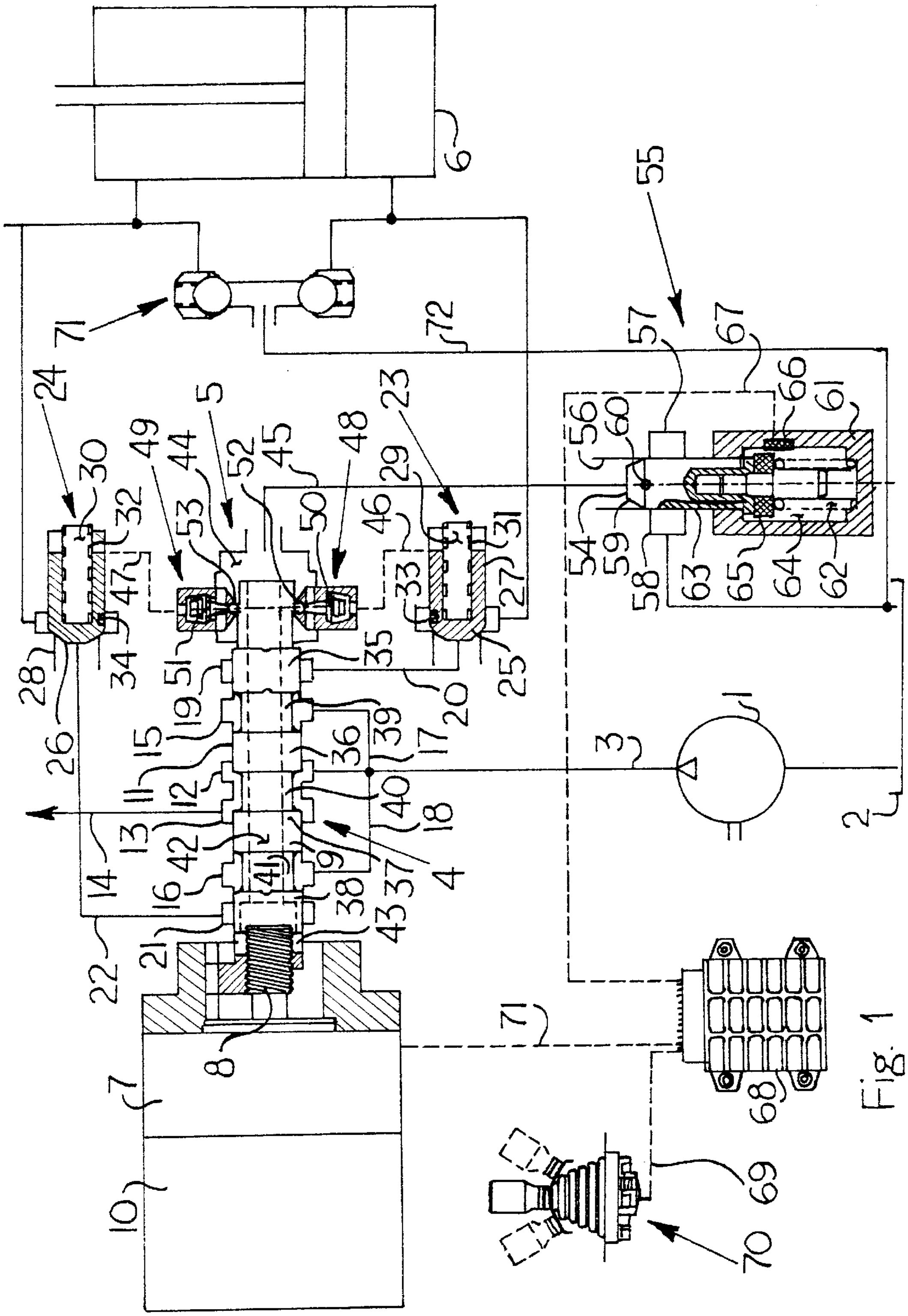
FIG. 1 schematically illustrates a first embodiment of a hydrostatic drive system according to the present invention with a control valve for the actuation of a double-action consuming device.

FIG. 1 shows a hydrostatic drive system according to the invention that has a pump 1 with a constant delivery volume that draws hydraulic fluid from a reservoir 2 and transports it into a delivery line 3. In the delivery line 3 there is a control valve 5 in the form of a directional control valve 4 with an open center position and is provided for the actuation of double-action consuming device 6. The consuming device 6 is a hydraulic cylinder, for example a tilting cylinder of the lifting platform of a fork lift truck. The directional control valve 4 can be actuated by a stepper motor 7, whereby the output shaft 8 of the stepper motor 7 is effectively connected with the valve slide 9 of the directional control valve 4. On the stepper motor 7 there is a spring retraction device 10 that pulls the directional control valve 4 into the illustrated neutral position when the stepper motor 7 is not actuated or in the event of a power failure.

The valve slide 9 of the directional control valve 4 is mounted so that it can move longitudinally in a housing boring 11 that is provided with a plurality of annular grooves. An annular groove 12 is in communication with the delivery line 3 of the pump 1. An annular groove 13 that is next to the annular groove 12 is in communication with a delivery line 14 that is in turn in communication, with the interposition of additional control valves for the actuation of additional consuming devices, with the reservoir 2. Additional annular grooves 15 and 16 are each in communication by a delivery branch line 17, 18 with the delivery line 3. next to the annular groove 15 there is an annular groove 19 that is in communication by a hydraulic line 20 with the piston-side compression chamber of the consuming device 6. An annular groove 21 that is next to the annular groove 16 is connected to a hydraulic line 22 that leads to the piston-rod-side compression chamber of the consuming device 6.

In each of the hydraulic lines 20 and 22 there are respective seat valves 23, 24 that open in the direction of the consuming device 6 and actuate a valve seat formed in a housing boring 27, 28 by a valve body 25, 26. The valve body 25, 26 has a control compression chamber 29, 30 that acts in the closing direction and in which a spring 31, 32 is located. The control compression chamber 29, 30 is also in communication via a throttle boring 33, 34 that is located in the valve body 25, 26 with the segment of the hydraulic lines 22, 20 that are connected to the consuming device.

The valve slide 9 of the directional control valve 4 has a plurality of piston flanges 35, 36, 37 and 38 and control grooves 39, 40 and 41 located between the piston flanges. The control groove 40, in the illustrated neutral position of the directional control valve 4, is in communication with the annular groove 12 and the annular groove 13, and makes possible the unpressurized circulation of the pump from the delivery line 3 into the delivery line 14. In the neutral position of the directional control valve 4, the control groove 39 is in communication with the annular groove 15 and the control groove 41 is in communication with the annular groove 16. The valve slide 9 has an axial boring 42 that penetrates the valve slide 9 in the axial direction, to which boring 42 a transverse boring 43 is connected in the vicinity of the piston flange 38. On the opposite area of the valve slide 9, the axial boring 42 is in communication with a ring-shaped chamber 44 in the housing boring 11. The ring-shaped chamber 44 is in communication with a return line 45 that leads to the reservoir 2.

Emptying into the ring-shaped chamber 44 are control pressure lines 46 and 47, which are in communication with the control compression chambers 29 and 30 of the seat valves 23 and 24. In each of the control pressure lines 46, 47 there is a pilot valve 48, 49, each of which is a check valve that isolates the flow in the direction of the ring-shaped chamber 44. The pilot valves 48, 49 can be mechanically actuated toward the open position by the valve slide 9, whereby the valve bodies 50, 51 of the pilot valves 48, 49 are in communication with connecting links 52, 53 formed on the valve slide 9 of the directional control valve 4.

In the return line 45, there is a delivery flow sensor 55 that has an axial longitudinally movable valve body 57 in a housing boring 56 that is in communication with the segment of the return line 45 connected to the ring-shaped chamber 44. The housing boring 56 makes a transition into an annular groove 58 that is connected to the segment of the return line 45 that leads to the reservoir. In the vicinity of an end surface 54 of the valve body 57 that is located in the housing boring 56, the valve body 57 is provided with a conical surface 59, whereby a micro-control groove 60 can be provided on the conical surface 59. The valve body 57, in the illustrated position in which the communication of the return line 45 from the housing boring 56 to the reservoir 2 is shut off, can be acted upon by a spring 62 located in a housing 61. As soon as hydraulic fluid flows in the return line 45, the valve body 57 is deflected downward in the figure by the hydraulic flow flowing against the end surface 54, and by the micro-control groove 60 and the conical surface 59, opens a communication between the return line 45 and the reservoir 2. The spring chamber 64 is connected to the reservoir 2 by a groove 63 that is located on the valve body 57. The opening travel of the valve body 57 is thereby a measure for the hydraulic flow to the delivery flow sensor 55 in the housing boring 56, and thus for the hydraulic flow flowing out of the consuming device. To measure the opening travel of the valve body 57, a permanent magnet 65 is fastened to the valve body 57 that is moved past a Hall sensor 66 that is fastened in a stationary manner in the housing 61 of the delivery flow sensor 55. The Hall sensor is in communication via a signal line with an electronic control 68, which is also effectively connected by a signal line 69 with actuator 70, for example a joystick, and by a signal line 71 with the stepper motor 7.

On the consuming device 6, there is a feeder device 71 that is formed from spring-loaded check valves, and that is in communication on the output side with the hydraulic lines 20 and 22. On the input side, the feeder device 71 is in communication with a hydraulic line 72 that is connected to the return line 45 downstream of the delivery flow sensor 55.

When the valve slide 9 is deflected to the right in the FIG. 1, the piston flange 37 throttles the open passage from the annular groove 12 to the annular groove 13. The piston flange 35, corresponding to the deflection of the valve slide 9, opens an inlet cross section from the annular groove 15 to the annular groove 19. Hydraulic fluid thereby builds up in the delivery branch line 17. As soon as the pressure built up in the delivery branch line 17 exceeds the load pressure of the consumer available in the control compression chamber 29 of the seat valve 23 and the force of the spring 31, the seat valve 23 is moved toward the open position. With the seat valve 3 in the open position, hydraulic fluid flows out of the delivery line 3 via the delivery branch line 17, the annular groove 15, the control groove 39, the annular groove 19 into the hydraulic line 20 and via the open seat valve 23 into the piston-side compression chamber of the consuming device 6. The seat valve 23 thus has, when the directional control valve 4 is in this switched position, the function of a load-holding valve and prevents the descent of the consuming device 6. The transverse boring 43 also comes into communication with the annular groove 21 and thus forms a discharge cross section that corresponds to the deflection of the valve slide 9. By the connecting link 53 on the valve slide 9, the valve body 51 of the pilot valve 49 is pushed into the open position, as a result of which the control compression chamber 30 of the seat valve 24 is placed in communication via the control line 47 and the open pilot valve 49 with the annular chamber 44 and thus with the reservoir 2, and the pilot valve 24 is actuated. Hydraulic fluid can thus flow out of the piston-rod-side compression chamber of the consuming device 6 via the open seat valve 24, the hydraulic line 22, the annular groove 21, the transverse boring 43 and the axial boring 42 into the annular chamber 44 and thus into the return line 45. In this switched position, the hydraulic line 20 represents the inlet side and the hydraulic line 22 the outlet side of the consuming device, whereby the seat valve 23 has the function of a load-holding valve.

Accordingly, when there is a deflection of the valve slide 9 to the left in the FIG. 1, the exposed passage is throttled by the piston flange 36 and an inlet cross section is created by the piston flange 38 from the annular groove 16 to the annular groove 21. The piston flange 35 thereby creates an outlet cross section from the annular groove 19 to the annular chamber 44, whereby the connecting link 52 acts on the pilot valve 48 into the open position and thereby opens the seat valve 23. In this switched position, the hydraulic line 22 represents the inlet side and the hydraulic line 20 represents the outlet side of the consuming device, whereby the seat valve 24 located in the inlet side also has the function of a load-holding valve.

The drive system illustrated in FIG. 1 is described as follows. An actuation or deflection of the actuator 70 by the operator will correspond to or specify one direction of motion and a desired speed of movement of the consuming device 6. The electronic control 68 actuates the stepper motor 7 corresponding to the direction of movement and the desired speed of movement set by the deflected actuator 70, whereupon the valve slide 9 is moved accordingly. The hydraulic fluid flowing out of the consuming device 6 in the return line 45 to the reservoir 2 is measured by the opening travel of the delivery flow sensor 55 of the electronic control 68. The actual speed of movement of the consuming device 6 is determined from the opening travel of the delivery flow sensor 55 in the electronic control 68, as a result of which, when there is a difference between the current speed of movement from the desired speed of movement, the electronic control 68 emits corresponding control signals to the stepper motor 7 to actuate the directional control valve 4 until the current speed of movement equals the desired speed of movement.

Even if the actual speed of movement of the consuming device 6 is the same as the desired speed of movement, there are different outflowing hydraulic fluid flows in the return line with a different direction of movement of the consuming device 6. This corresponds to the difference in surface area between the piston side and the piston-rod side of the hydraulic cylinder. The electronic control 68 is structured so that, as a function of the direction of movement of the consuming device 6, it can determine from the opening travel of the delivery flow sensor 55 the current speed of movement of the consuming device 6 depending on whether the piston side or the piston-rod side of the consuming device, which is a hydraulic cylinder, forms the discharge side.

As a result of the regulation of the current speed of movement of the consuming device 6 as a function of the current speed of movement measured by the delivery flow sensor 55, and the desired speed of movement set by the actuator 70, the consuming device 6 can be operated at the desired speed of movement set by the actuator 70 even in the event of the simultaneous actuation of an additional consuming device with a higher load pressure.

It is also possible, when there is a reversal of the load direction on the consuming device 6, to actuate the directional control valve 4 from a positive load to a negative load, so that the desired speed of movement can be maintained.

If the delivery flow sensor 55 supplies a signal that indicates an excessive current speed of movement of the consuming device 6, the situation can have two causes. There may be a simultaneous actuation of a plurality of consuming devices, and an additional consumer which requires a higher system pressure. The hydraulic fluid delivered by the pump 1 thus flows with priority to the consuming device 6 with the lower load pressure, as a result of which its actual speed of movement increases. The electronic control 68 can counteract such an operating condition by reducing the communication of the delivery branch line 17 or 18 with the consuming device 6 and thus of the inlet cross section at the directional control valve 4, until the actual speed of movement equals the desired speed of movement. Alternatively, the delivery flow sensor 55 also measures an excessive current speed of movement if, at the consuming device 6, there is a reversal of the load direction, for example from a positive load to a negative load. In the event of such a load exerted on the consuming device 6, a greater flow of hydraulic fluid flows out of the discharge side of the consuming device 6 than flows into the inlet side of the consuming device 6, as a result of which its current speed of movement increases. Under such operating conditions, the electronic control 68 can counteract an increase in the actual speed of movement by reducing the outlet cross section on the directional control valve 4 from the consuming device 6 to the reservoir 2. A shortage on the inlet side of the consuming device 6 can thereby be prevented by the feeder device 71.

If the delivery flow sensor 55 in the return line 45 measures an excessive actual speed of movement of the consuming device 6, the electronic control 68 cannot detect whether this increase in the current speed of movement was caused by a simultaneous actuation of a plurality of consuming devices 6 or by a reverse in the direction of the load exerted on the consuming device 6. To make possible an equalization of the actual speed of movement to the desired speed of movement, the directional control valve 4 is formed so that in the event of the deflection of the valve slide 9 toward the neutral position, first the inlet cross section from the pump 1 to the consuming device 6 is reduced. Consequently, in the event of the simultaneous actuation of a plurality of consuming devices 6, it is possible to counteract an increase in the actual speed of movement. If the delivery flow sensor 55 continues to indicate an excessive actual speed of movement, a further deflection of the valve slide 9 toward the neutral position reduces the outflow cross section. Consequently, when a negative load is applied to the consuming device 6, it is possible to counteract an increase in the actual speed of movement of the consuming device 6. Because in such a switched position, the inlet cross section from the pump 1 to the consuming device 6 is already severely reduced or may even be completely closed, the inlet side of the consuming device 6 is supplied with hydraulic fluid by the feeder device 71, which makes possible a connection between the inlet side of the consuming device 6 and the reservoir 2.

Figure 2:
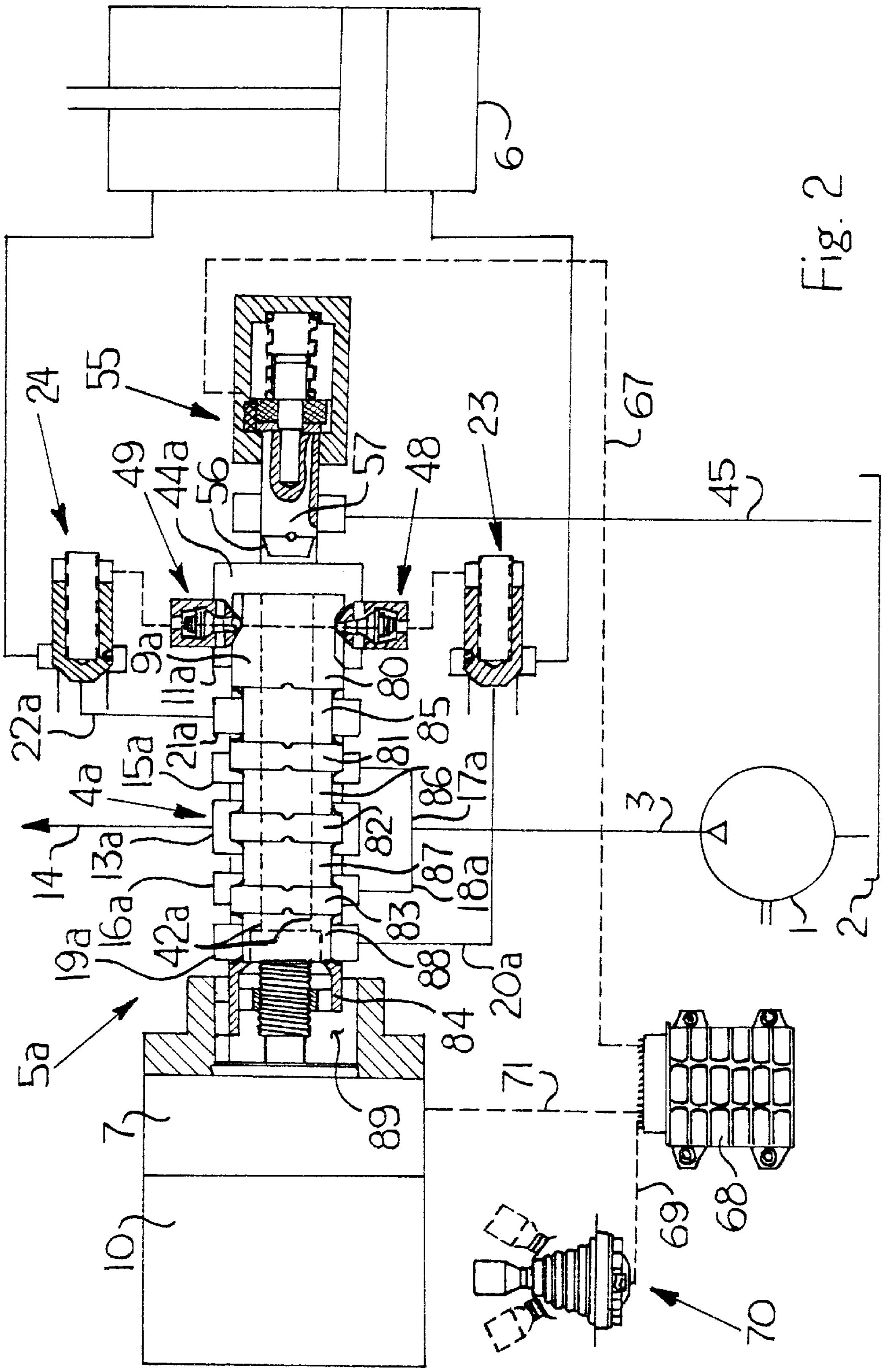
FIG. 2 schematically illustrates a modification of the embodiment illustrated in FIG. 1.

FIG. 2 shows a refinement of the drive system illustrated in FIG. 1, whereby the identical components are identified by the same reference numbers. On the housing boring 11*a* of the directional control valve 4*a* of the control valve 5*a*, there are a plurality of annular grooves 13*a*, 15*a*, 16*a*, 19*a* and 21*a*, whereby the annular groove 15*a* is in communication with a delivery branch line 17*a* that branches off from the delivery line 3. The annular groove 16*a* is in communication with a delivery branch line 18*a* that branches off from the delivery line 3. The annular groove 21*a* is in communication with a hydraulic line 22*a* that is connected to the piston-rod side of the consuming device 6, and the annular groove 19*a* is connected to a hydraulic line 20*a* that is in communication with the piston side of the consuming device 6. The annular groove 13*a* is connected to the delivery line 14 which, with the interposition of additional control valves 5*a*, is in communication with the reservoir 2.

On the valve slide 9*a* of the directional control valve 4*a* there are a plurality of piston flanges 80, 81, 82, 83, 84, wherein between the piston flanges there are control grooves 85, 86, 87, 88. The piston flanges 81, 82, 83 and the control grooves 86, 87 are located so that in the illustrated neutral position of the valve slide 9*a*, the annular groove 15*a* and the annular groove 16*a* are in communication with the annular groove 13*a*. Therefore, the delivery branch lines 17*a*, 18*a* are connected with the delivery line 14. When the directional control valve 4*a* is in the neutral position, the pump 1 therefore delivers in an unpressurized circulation from the delivery line 3 into the delivery line 14.

In the event of a deflection of the valve slide 9*a* to the right in the FIG. 2, the piston flange 83 throttles the communication between the annular groove 16*a* and the annular groove 13*a* and opens an admission cross section from the annular groove 16*a* to the annular groove 19*a*. The piston flange 82 also throttles the open passage from the annular groove 15*a* to the annular groove 13*a*. The piston flange 80 opens a discharge cross section from the annular groove 21 into the annular chamber 44*a*.

In the event of a deflection of the valve slide 9*a* to the left in the FIG. 2, the piston flange 81 throttles the open passage from the annular groove 15*a* to the annular groove 13*a* and opens an admission cross section from the annular groove 15*a* to the annular groove 21*a*. The piston flange 82 also throttles the open passage from the annular groove 16*a* into the annular groove 13*a*. The discharge cross section is determined by the piston flange 84, whereby the annular groove 19*a* is in communication with the control groove 88 with a housing compartment 89 of the stepper motor 7, which is connected by an axial boring 42*a* that runs axially through the control slide 9*a* to the annular chamber 44*a*. The function and the actuation of the seat valves 23 and 24 located in the hydraulic lines 20*a*, 22*a* occur in the manner described above by the relief valves 48 and 49.

The delivery flow sensor 55 located in the return line 45 which is in communication with the reservoir 2 is oriented coaxially to the directional control valve 4*a*. The housing boring 56 is connected in the axial direction to the annular chamber 44*a* and the valve body 57 of the delivery flow sensor 55 is oriented coaxially to the valve slide 9*a* of the directional control valve 4*a*.

The function of the drive system illustrated in FIG. 2 corresponds to the function of the drive system illustrated in FIG. 1.

Figure 3:
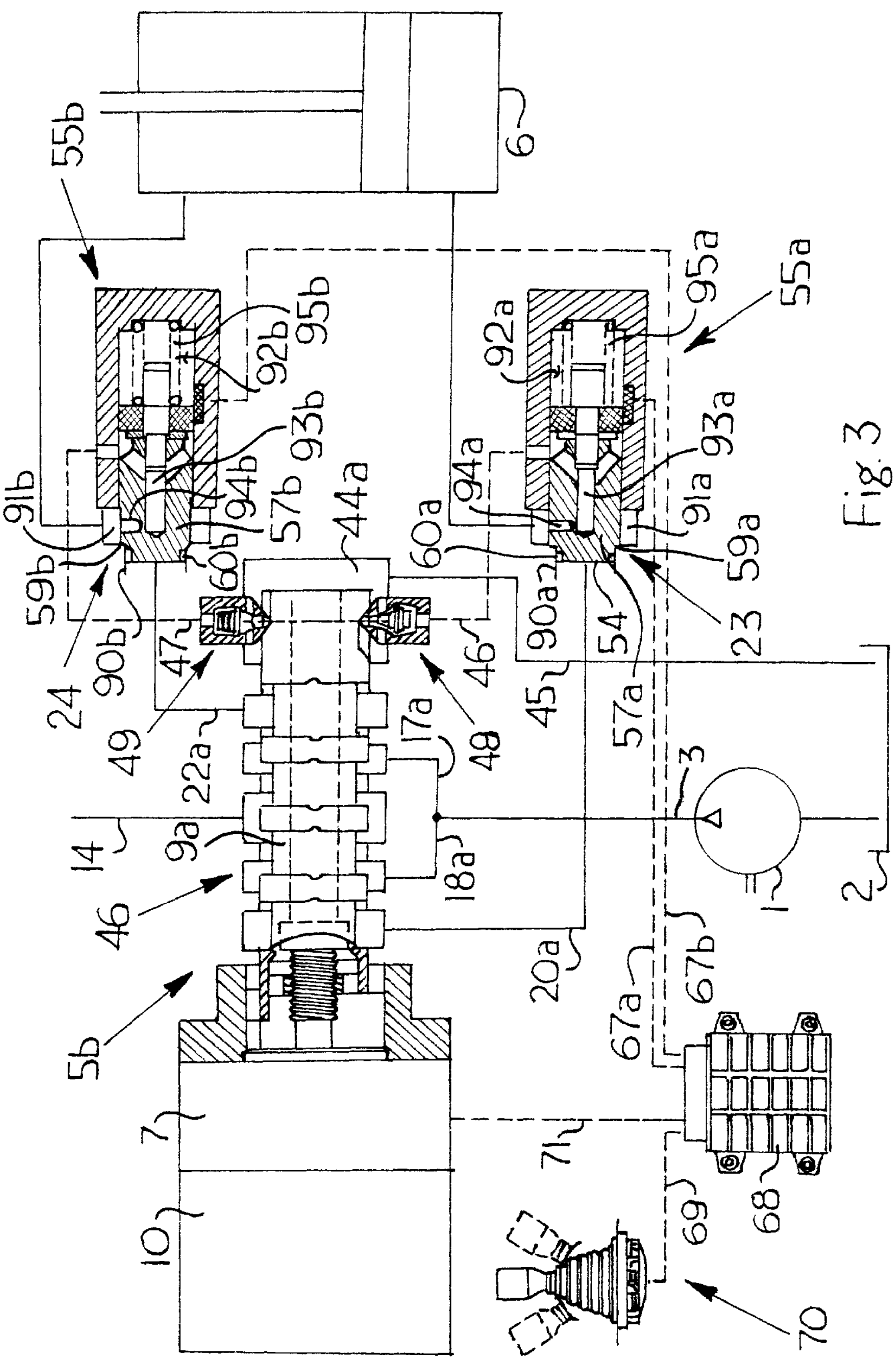
FIG. 3 schematically illustrates a second embodiment of a hydrostatic drive system according to the present invention with a control valve for the actuation of a double-action consuming device.

FIG. 3 illustrates an additional hydrostatic drive system according to the present invention, wherein the control valve 5*b* is a directional control valve 4*b* which corresponds to the directional control valve 4*a* in FIG. 2. In each of these cases, a delivery flow sensor 55*a*, 55*b* is integrated into a seat valve 23, 24 and/or the delivery flow sensors 55*a*, 55*b* located in the hydraulic lines 20*a*, 22*a* are in the form of seat valves 23, 24.

At the transition from a housing boring 90*a*, 90*b* of the delivery flow sensor 55*a*, 55*b*, which is in communication with the segment of the hydraulic line 20*a*, 22*a* leading to the directional control valve 4*b*, and of an annular chamber 91*a*, 91*b*, to which is connected the respective segment of the hydraulic line 20*a*, 22*a* connected to the consuming device 6, a valve seat is formed that can be actuated by a conical surface 59*a*, 59*b* formed on the valve body 57*a*, 57*b* of the delivery flow sensor 55*a*, 55*b*. In the vicinity of the conical surface 59*a*, 59*b*, there is also a micro-control groove 60*a*, 60*b* on the valve body 57*a*, 57*b*. A control compression chamber 92*a*, 92*b* that acts in the closing direction of the valve body 57*a*, 57*b* is in communication with a system of borings 93*a*, 93*b* located in the valve body 57*a*, 57*b* and a throttle boring 94*a*, 94*b* that is connected with it, with the annular chamber 91*a*, 91*b*. A spring 95*a*, 95*b* is also located in the control compression chamber 92*a*, 92*b*. The control compression chamber 92*a* of the delivery flow sensor 55*a* is in communication via a control pressure line 46 with the annular chamber 44*a*. The pilot valve 48 that can be moved by the valve slide 9*a* into the open position is located in the control pressure line 46. The control compression chamber 92*b* of the delivery flow sensor 55*b* is connected with the annular chamber 44 by the control pressure line 47 and the pilot valve 49 located in it and actuated by the valve slide 9*a*.

If, by the valve slide 9*a*, the hydraulic line 20*a* is connected to the delivery branch line 18*a* and the hydraulic line 22*a* to the annular chamber 44*a*, the hydraulic line 20*a* forms the admission side and the hydraulic line 22*a* the discharge side of the consuming device 6. The delivery flow sensor 55*a* thereby performs the function of the load-holding valve and of the delivery flow sensor, and measures the hydraulic flow flowing to the consuming device 6, as a result of which the actual speed of movement of the consuming device 6 can be determined in the electronic control 68. The delivery flow sensor 55*b* is actuated by the open seat valve 49.

If the valve slide 9*a* connects the hydraulic line 22*a* with the delivery branch line 17*a* and the hydraulic line 20*a* with the annular chamber 44*a*, the hydraulic line 22*a* represents the admission side and the hydraulic line 20*a* the discharge side of the consuming device 6. In such a switched position of the directional control valve 4*a*, the pilot valve 48 is opened and the delivery flow sensor 55*a* is actuated. The delivery flow sensor 55*b* located in the admission side thereby performs the function of the load-holding valve and of the delivery flow sensor, which is in communication via the signal line 67*b* with the electronic control 68.

The delivery flow sensor 55*a* or 55*b* located in the inlet side 20*a* or 22*a* therefore measures the quantity of hydraulic fluid flowing to the consuming device 6, whereby the deflection of the valve slide 9*a* is controlled by the electronic control 68 according to a desired speed of movement set on the actuation means 70 and the actual speed of movement measured by the delivery flow sensor 55*a*, 55*b*. Operation and a leakage-free isolation of the consuming device 6, independently of the load, is thereby possible with little effort and expense in terms of construction. In this embodiment, a delivery flow sensor 55*a*, 55*b* can also be located in the return line 45, which delivery flow sensor 55*a*,

55*b* measures the hydraulic flow flowing out of the consuming device 6, as a result of which the consuming device can also be operated independently of the direction of the load.

Figure 4:
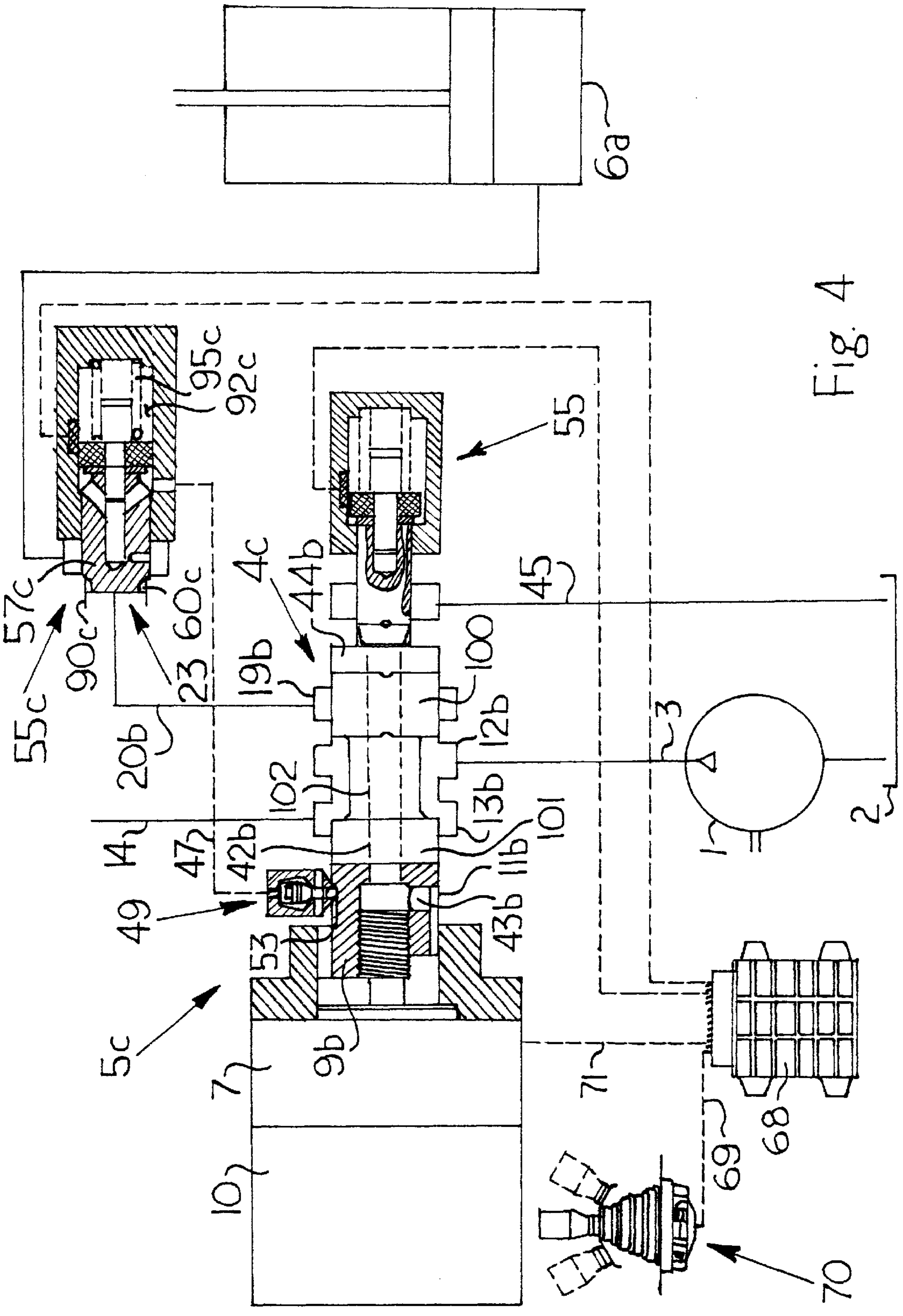
FIG. 4 schematically illustrates a third embodiment of a hydrostatic drive system according to the present invention with a control valve for the actuation of a single-action consuming device.

FIG. 4 illustrates another embodiment of a drive system according to the invention with a control valve 5*c* for the actuation of a single-action consuming device 6*a*, for example the hoisting cylinder of a hoisting mast of a fork lift truck. The valve slide 9*b* of the directional control valve 4*c* of the control valve 5*c* is thereby mounted so that it can move longitudinally in a housing boring 11*b*, whereby annular grooves 12*b*, 13*b* and 19*b* are formed in the housing boring 11*b*. The annular groove 12*b* is in this case connected to the delivery line 3 of the pump 1 and the annular groove 13*b* to the delivery line 14. The annular groove 19*b* is in communication with the hydraulic line 206 that leads to the consuming device 6*a*. The valve slide 9*b* has piston flanges 100 and 101, whereby between the piston flanges 100, 101 a control groove 102 is formed which, in the illustrated neutral position, makes possible the unpressurized circulation from the delivery line 3 into the delivery line 14. In the return line 45 that leads from the annular chamber 44*b* to the reservoir, there is a delivery flow sensor 55 that can be located, for example, coaxially with the valve slide 9*b*. In the hydraulic line 20*b*, there is a delivery flow sensor 55*c* realized in the form of a seat valve, which can be actuated into the open position by means of a seat valve 49 located in a control line 47. The seat valve 49 can be pushed by a connecting link 53 formed on the valve slide 53 into the open position in response to a corresponding deflection of the valve slide 9*b*.

In the event of a deflection of the valve slide 9*b* to the right in FIG. 4, to raise a load on the consuming device 6*a*, the piston flange 101 throttles the flow through the pump 1 from the delivery line 3 into the delivery line 13. The piston flange 100, as a function of the deflection of the valve slide 9*b*, opens an inlet cross section from the annular groove 12*b* to the annular groove 19*b*. The valve body 57*c* is being pushed by the load pressure of the consuming device and by the spring 95*c* toward the closed position. As soon as the pressure that builds up in the hydraulic line 20*b* is sufficient to push the valve body 57*c* of the delivery flow sensor 55*c* toward the open position, hydraulic fluid flows from the pump 1 to the consuming device 6. The delivery flow sensor 55*c* thereby has the function of a load-holding valve. The delivery flow sensor 55*c* measures the hydraulic flow flowing to the consuming device 6*a*. In the electronic control 68, the desired speed of movement specified by the actuation or deflection of actuator 70 is compared with the actual speed of movement measured by the delivery flow sensor 55*c*, and the valve slide 9*b* is regulated accordingly. Consequently, in the switched position for the lifting of a load, the consuming device 6*a* can be operated independently of the load.

When there is a deflection of the valve slide 9*b* to the left in FIG. 4 to lower a load that is engaged on the consuming device 6*a*, the piston flange 100, corresponding to the deflection of the valve slide 9*b*, forms a discharge cross section from the annular groove 19*b* into the annular compartment 44*b*. Through the connecting link 53 on the valve slide 9*b*, the pilot valve 49 is pushed into the open position, whereupon the control line 47 is in communication with the annular compartment 44*b* by a transverse boring 43*b* located in the valve slide 9*b* and a longitudinal boring 42*b* connected to it. The delivery flow sensor 55*c*, which is a seat valve, is thus moved into the open position and connects the hydraulic line 20*b* with the annular compartment 44*b* and thus the return line 45. The quantity of hydraulic fluid flowing out of the consuming device 6*a* is thereby measured by the delivery flow sensor 55 located in the return line 45. The current speed of movement of the consuming device 6*a* when the consuming device 6*a* is in the action of lowering a load is thus measured by the quantity of hydraulic fluid flowing out of it. It is thereby possible, during descent operation, to control the actual speed of movement independently of the load of the consuming device 6*a*, so that it corresponds to the specified speed of movement.

What is claimed is:

1. Hydrostatic drive system for at least one consuming device, the hydrostatic drive system comprising:

a pump connected to the consuming device;

a control valve for actuating the pump;

an actuator that specifies a desired speed of movement and a direction of movement of the consuming device, wherein the control valve can be actuated as a function of the actuator, wherein a neutral position of the control valve provides an unpressurized circulation of the pump, and wherein the control valve can be actuated electrically;

a delivery flow sensor that measures the actual speed of movement of the consuming device, wherein there is a delivery flow sensor located in each hydraulic line leading from the control valve to the consuming device and wherein each hydraulic line can be connected by the control valve to a delivery line of the pump; and an electronic control, wherein the control valve, the sensor and the actuator are coupled to the electronic control, and the electronic control controls the control valve as a function of the deflection of the actuator and of the actual speed of movement of the consuming device measured by the sensor.

2. The hydrostatic drive system as claimed in claim 1, wherein the consuming device is a double-action consuming device.

3. The hydrostatic drive system as claimed in claim 1, wherein the consuming device is a single-action consuming device, and wherein a delivery flow sensor is in a hydraulic line leading from the control valve to the consuming device when the consuming device is in communication with the pump through the control valve, and a delivery flow sensor is in a return line leading from the control valve to the reservoir when the consuming device is in communication with the reservoir through the control valve.

4. The hydrostatic drive system as claimed in claim 1, further including a seat valve in a hydraulic line leading from the control valve to the consuming device.

5. The hydrostatic drive system as claimed in claim 4, wherein the seat valve has a control compression chamber that acts in the closing direction and acted upon with the load pressure of the consuming device and a spring.

6. The hydrostatic drive system as claimed in claim 4, wherein the seat valve can be actuated when the hydraulic line is connected by the control valve with the reservoir.

7. The hydrostatic drive system as claimed in claim 6, further including a pilot valve that can be mechanically actuated by the control valve, wherein the seat valve can be actuated by the pilot valve.

8. The hydrostatic drive system as claimed in claim 1, wherein the delivery flow sensor is a seat valve.

9. The hydrostatic drive system as claimed in claim 1, further including a stepper motor, wherein the control valve can be actuated by a stepper motor.

10. The hydrostatic drive system as claimed in claim 9, wherein the stepper motor has a spring retraction device.

11. The hydrostatic drive system as claimed in claim 1, wherein the delivery flow sensor has a valve body moveable longitudinally in a housing boring, wherein the valve body can be pushed toward a closed position by a spring and toward an open position by the hydraulic fluid flowing toward an active surface of the valve body.

12. The hydrostatic drive system as claimed in claim 11, wherein the deflection of the valve body of the delivery flow sensor can be measured an inductive sensor.

13. The hydrostatic drive system as claimed in claim 11, wherein the valve body of the delivery flow sensor is connected with a Hall sensor.

14. The hydrostatic drive system as claimed in claim 13, wherein the valve body of the delivery flow sensor is provided with a permanent magnet body that is connected with a Hall sensor located in a housing of the delivery flow sensor and wherein the Hall sensor is connected to the electronic control.

15. The hydrostatic drive system as claimed in claim 11, wherein the valve body of the delivery flow sensor is provided with a micro-control device.

16. The hydrostatic drive system as claimed in claim 1, wherein the control valve is a directional control valve that throttles in intermediate positions and has an open center position.

17. The hydrostatic drive system as claimed in claim 16, wherein the delivery flow sensor is oriented coaxially to a valve slide of the directional control valve.

18. The hydrostatic drive system as claimed in claim 1, wherein the pump has a constant delivery volume.

19. The hydrostatic drive system as claimed in claim 1, wherein the pump has a variable delivery volume, and further including a delivery flow regulator connected with the electronic control.

20. The hydrostatic drive system as claimed in claim 1, wherein said drive system is installed in a fork lift truck.

21. A hydrostatic drive system for at least one double-action consuming device, the hydrostatic drive system comprising:

a pump connected to the consuming device;

a control valve for actuating the pump;

an actuator that specifies a desired speed of movement and a direction of movement of the consuming device, wherein the control valve can be actuated as a function of the actuator, wherein a neutral position of the control valve provides an unpressurized circulation of the pump, and wherein the control valve can be actuated electrically;

a delivery flow sensor that measures the actual speed of movement of the consuming device, wherein the delivery flow sensor is located in a return line that leads from the control valve to the reservoir; and an electronic control, wherein the control valve, the sensor and the actuator are coupled to the electronic control and the electronic control controls the control valve as a function of the deflection of the actuator and of the actual speed of movement of the consuming device measured by the sensor.

22. A hydrostatic drive system for at least one double-action consuming device, the hydrostatic drive system comprising:

a pump connected to the consuming device;

a control valve for actuating the pump, wherein when the control valve is actuated toward the neutral position, an admission cross section can be reduced before a discharge cross section by the control valve;

an actuator that specifies a desired speed of movement and a direction of movement of the consuming device, wherein the control valve can be actuated as a function of the actuator, wherein a neutral position of the control valve provides an unpressurized circulation of the pump, and wherein the control valve can be actuated electrically;

a delivery flow sensor that measures the actual speed of movement of the consuming device, wherein the delivery flow sensor is located in a hydraulic line that leads from the consuming device to the reservoir; and an electronic control, wherein the control valve, the sensor and the actuator are coupled to the electronic control and the electronic control controls the control valve as a function of the deflection of the actuator and of the actual speed of movement of the consuming device measured by the sensor.

23. The hydrostatic drive system as claimed in claim 22, further including a feeder device on the consuming device that is in communication on the admission side with a return line leading from the control valve to the reservoir downstream of the delivery flow sensor.

24. The hydrostatic drive system as claimed in claim 22, wherein a delivery flow sensor is located in each hydraulic line leading from the control valve to the consuming device, and wherein each hydraulic line is connected by the control valve to a delivery line of the pump.

25. A hydrostatic drive system for at least one double-action consuming device, the hydrostatic drive system comprising:

a pump connected to the consuming device;

a control valve for actuating the pump;

an actuator that specifies a desired speed of movement and a direction of movement of the consuming device, wherein the control valve can be actuated as a function of the actuator, wherein a neutral position of the control valve provides an unpressurized circulation of the pump, and wherein the control valve can be actuated electrically;

a delivery flow sensor that measures the actual speed of movement of the consuming device;

a seat valve in a hydraulic line leading from the control valve to the consuming device, wherein the seat valve can be actuated when the hydraulic line is connected by the control valve with the reservoir and wherein the seat valve has a control compression chamber that acts in the closing direction;

a pilot valve that can be mechanically actuated by the control valve, wherein the seat valve can be actuated by the pilot valve, wherein a control pressure line leading from the control compression chamber is the pilot valve that is a spring-loaded check valve and has a valve body actuated by movement of a valve slide of the control valve into an open position; and an electronic control, wherein the control valve, the sensor and the actuator are coupled to the electronic control and the electronic control controls the control valve as a function of the deflection of the actuator and of the actual speed of movement of the consuming device measured by the sensor.

* * * * *